(12) United States Patent
Tsuji

(10) Patent No.: US 7,656,215 B2
(45) Date of Patent: Feb. 2, 2010

(54) CLOCK GENERATOR CIRCUIT, CLOCK SELECTOR CIRCUIT, AND SEMICONDUCTOR INTEGRATED CIRCUIT

(75) Inventor: Nobuhiro Tsuji, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 12/073,332

(22) Filed: Mar. 4, 2008

(65) Prior Publication Data

US 2008/0224753 A1 Sep. 18, 2008

(30) Foreign Application Priority Data

Mar. 13, 2007 (JP) ............................. 2007-063725

(51) Int. Cl.
*G06F 1/04* (2006.01)
(52) U.S. Cl. ........................... 327/292; 327/99; 327/298
(58) Field of Classification Search ........................ None
See application file for complete search history.

(56) References Cited

U.S. PATENT DOCUMENTS

| | | | | |
|---|---|---|---|---|
| 5,142,247 A | * | 8/1992 | Lada et al. ..................... | 331/14 |
| 5,903,748 A | * | 5/1999 | McCollough et al. ........ | 713/503 |
| 6,111,442 A | * | 8/2000 | Aulet et al. .................. | 327/156 |
| 6,906,570 B2 | * | 6/2005 | Kim ............................ | 327/292 |
| 7,288,975 B2 | * | 10/2007 | Ngo et al. .................... | 327/156 |

FOREIGN PATENT DOCUMENTS

JP 61-41243 2/1986
JP 10-124167 5/1998

* cited by examiner

*Primary Examiner*—An T Luu
(74) *Attorney, Agent, or Firm*—McGinn IP Law Group, PLLC

(57) ABSTRACT

A clock generator circuit provides an output clock without an abnormal waveform pulse which causes faulty operation in other function circuits. A phase synchronizing circuit outputs a second clock synchronized with a first clock. A selector signal generator circuit outputs a switching signal when detecting the abnormal waveform pulse in the second clock. A selector outputs the first clock instead of the second clock as the output clock based on the switching signal. A delay circuit delays the second clock input to the selector so that the selector switches the output clock from the second clock to the first clock before the abnormal waveform pulse is input to the selector.

14 Claims, 11 Drawing Sheets

CLOCK GENERATOR CIRCUIT, CLOCK SELECTOR CIRCUIT, AND SEMICONDUCTOR INTEGRATED CIRCUIT

FIELD OF THE INVENTION

The present invention relates to a clock generator circuit, a clock selector circuit, and a semiconductor integrated circuit.

BACKGROUND OF THE INVENTION

In recent years remarkable progress has been made in semiconductor (particularly in microcomputers) technology. The individual function circuits incorporated into these semiconductor integrated circuits must provide high performance.

Phase synchronizing circuits (hereafter PLL {phase locked loop circuits}) are widely used in semiconductor integrated circuits as frequency multipliers. A semiconductor integrated circuit incorporating an internal PLL circuit can generate clocks at a frequency N number of times higher than the reference (basic) frequency.

The PLL circuit must output a stable clock pulse. However, a distortion in the clock waveform output from the PLL circuit has become a problem along with lower supply voltages in recent years. Namely, the PLL circuit generates an output clock by utilizing a voltage controlled oscillator (VCO). However the output clock waveform becomes distorted due to jitter or fluctuations in the VCO supply voltage. Distortion in the output clock waveform might cause faulty operation in other function circuits that operate based on the output clock.

JP-A No. H10 (1998)-124167 discloses technology for selectively outputting clocks from separate oscillator circuits. FIG. 11 shows the technology of JP-A No. H10 (1998)-124167. A multiplexer 84 as shown in FIG. 11, changes the output clock from the clock of the oscillator circuit 81 to the clock of the oscillator circuit 82, based on decision results from the monitor circuit 83. JP-A No. S61 (1986)-41243 discloses an apparatus for detecting abnormal clock pulses.

The present inventor has recognized that a clock with an abnormal waveform output from a PLL circuit may cause problems such as faulty operation in other function circuits. The problems still remain even if using technology as in JP-A No. H10 (1998)-124167 that selectively outputs the basic clock input to the PLL circuit or clock output from the PLL circuit.

SUMMARY

The present invention seeks to solve one or more of the above problems, or to improve upon those problems.

The clock generator circuit of the present invention includes: a phase synchronizing (PLL) circuit for outputting a second clock synchronized with a first clock; a selector for outputting either the first clock or the second clock as an output clock; a selector signal generator circuit for outputting a switching signal to the selector to output the first clock instead of the second clock when an abnormal waveform pulse was detected in the second clock output from the phase synchronizing circuit; and a delay circuit for delaying the second clock input from the phase synchronizing circuit to the selector so that the abnormal waveform pulse contained in the second clock is input to the selector after the selector switches the output clock from the second clock to the first clock based on the switching signal.

The present invention in this way effectively prevents other function circuits from faulty operation due to the abnormal waveform clock output from the PLL circuit.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 4 is an overall circuit diagram showing the abnormal pulse detector circuit 13a;

FIG. 5A is a timing chart for describing the operation of the abnormal pulse detector circuit 13a;

FIG. 5B is a timing chart for describing the operation of the abnormal pulse detector circuit 13a;

DETAILED DESCRIPTION OF THE PREFERRED EMBODIMENTS

Figure 1:
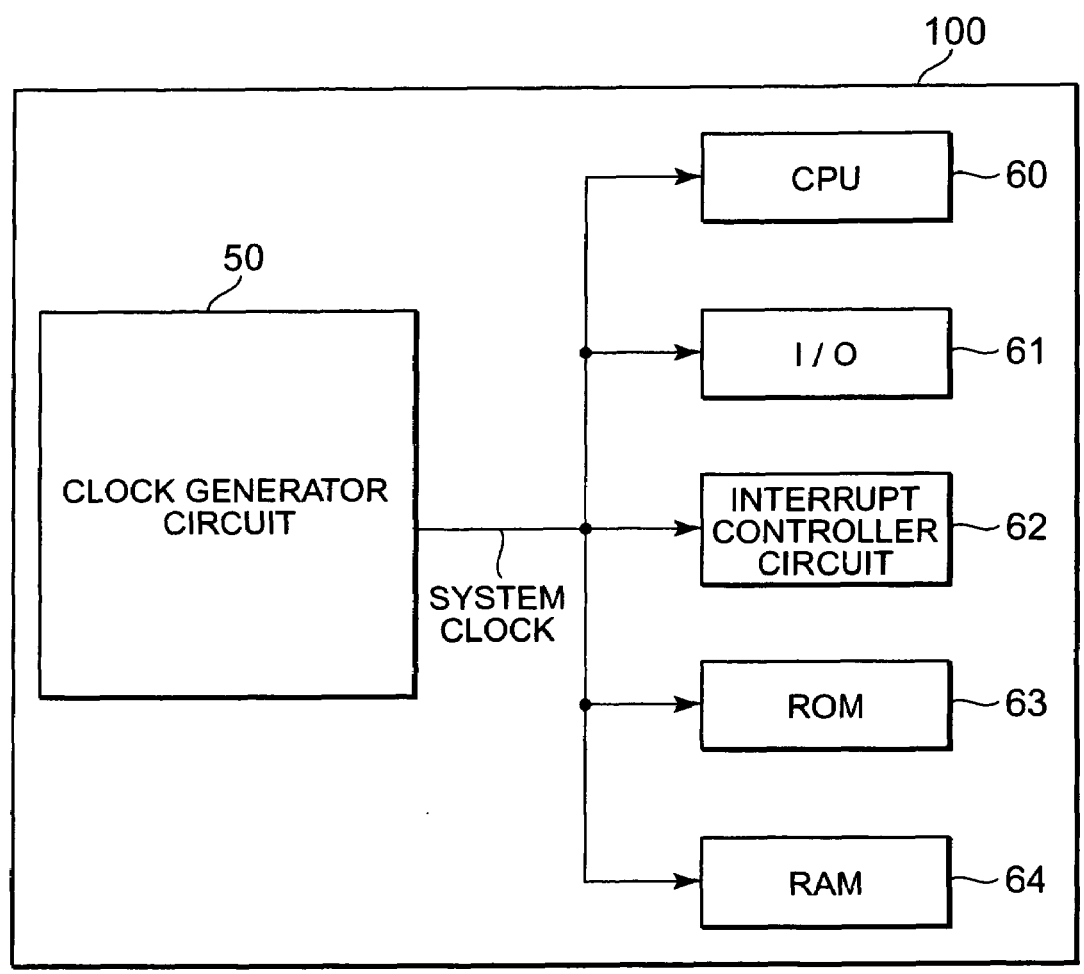
FIG. 1 is a block diagram showing the overall structure of the semiconductor integrated circuit (microcomputer) including a clock generator circuit 50.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

The embodiments of this invention are described next while referring to the drawings. The drawings are simplified and accurate sizes and other items of the structural elements are not shown. Moreover the drawings should not be interpreted as restricting the technical scope of this invention. The same elements are assigned the same reference numerals and redundant sections are omitted.

First Embodiment

Figure 2:
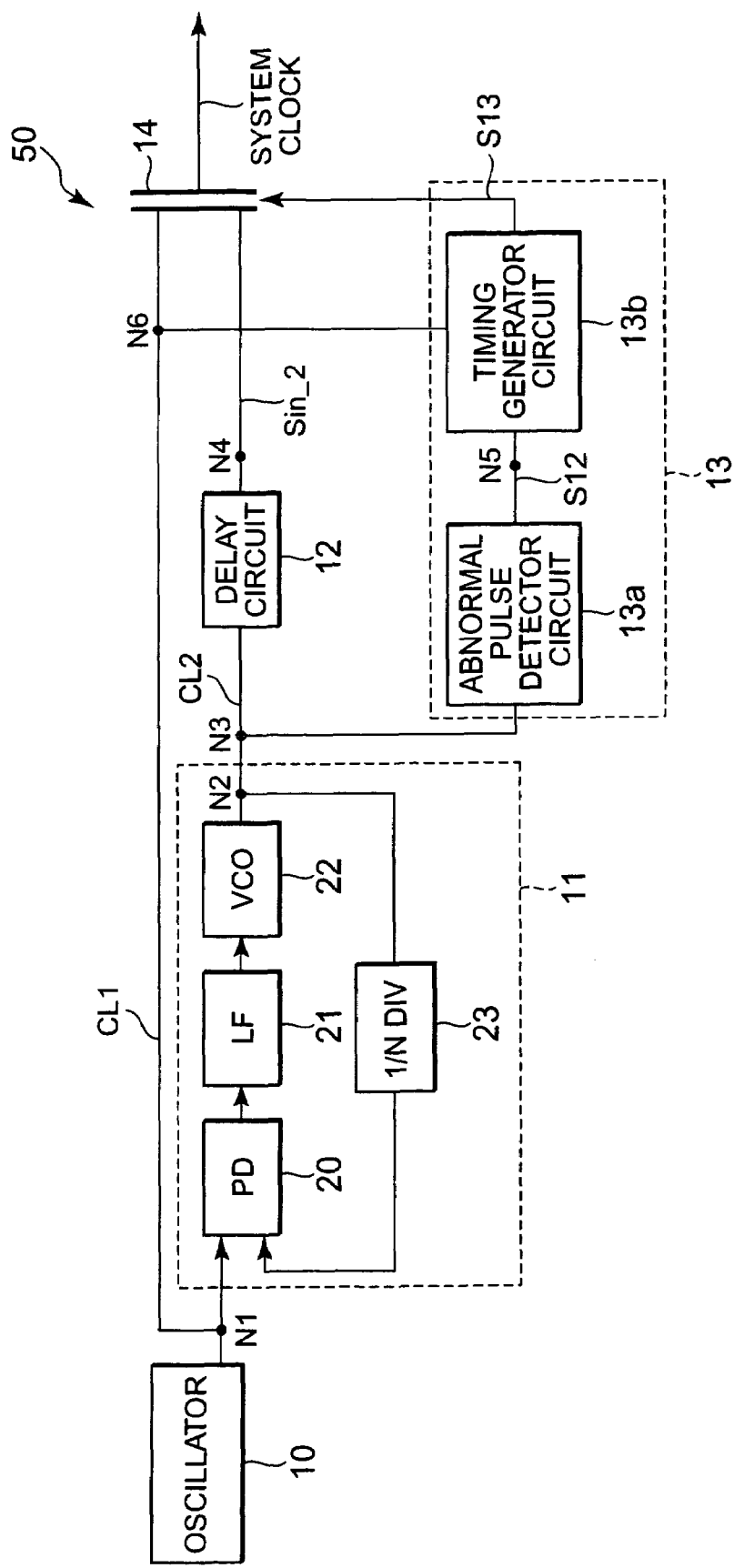
FIG. 2 is a circuit block diagram showing the overall structure of the clock generator circuit 50.
Figure 3:
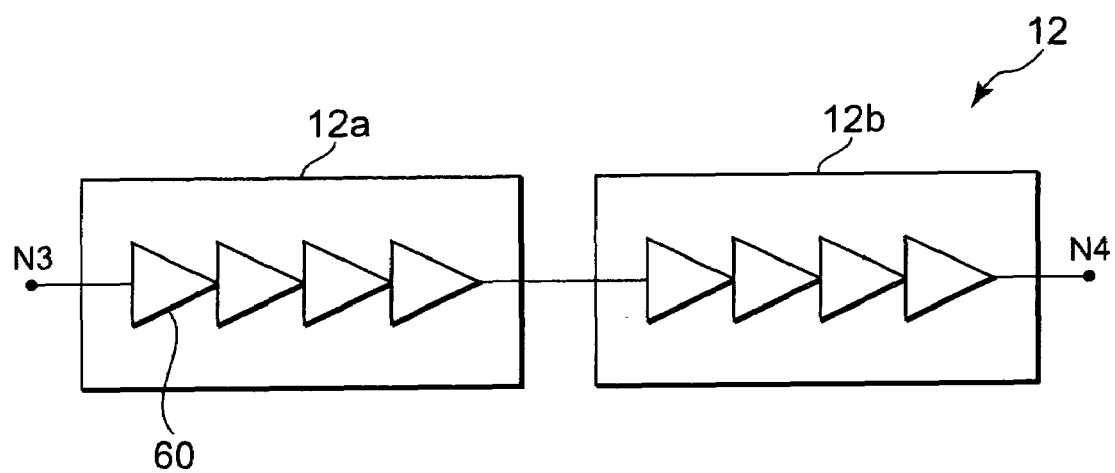
FIG. 3 is a circuit block diagram showing the overall structure of the delay circuit 12.
Figure 4:
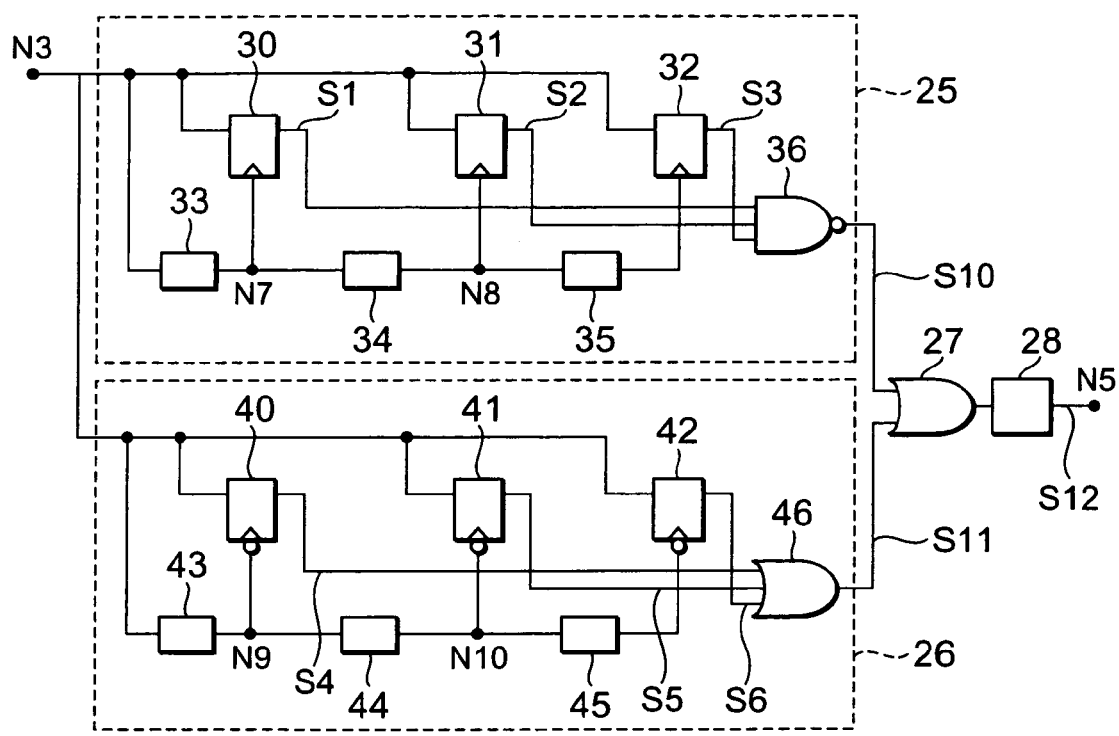

The first embodiment of this invention is described next while referring to FIG. 1 through FIG. 6. FIG. 1 is a block diagram showing the overall structure of the semiconductor integrated circuit (microcomputer) including a clock generator circuit 50. FIG. 2 is a circuit block diagram showing the overall structure of the clock generator circuit 50. FIG. 3 is a circuit block diagram showing the overall structure of the delay circuit 12. FIG. 4 is an overall circuit diagram showing the overall abnormal pulse detector circuit 13a. FIG. 5 is a timing chart for describing the operation of the abnormal pulse detector circuit 13a. FIG. 6 is a timing chart for describing the operation of the clock generator circuit.

The semiconductor integrated circuit 100 as shown in FIG. 1, includes a clock generator circuit 50, a CPU (Central Processing Unit) 60, an I/O (Input/Output) circuit 61, an interrupt controller circuit 62, a ROM (Read Only Memory) 63, and a RAM (Random Access Memory) 64. The function circuits CPU60 through RAM 64 operate based on the clock (system clock) output from the clock generator circuit 50.

The clock generator circuit 50 as shown in FIG. 2 includes an oscillator 10, a PLL circuit 11, a delay circuit 12, a selector signal generator circuit-13 (abnormal pulse detector circuit 13a, timing control circuit 13b) and a selector 14.

The PLL circuit 11 includes a PD (Phase Detector) 20, a LF (Loop Filter) 21, a VCO (Voltage Controlled Oscillator) 22, and a 1/N DIV (1/N Divider) 23. The PD20 may be called a phase difference detector 20, the LF 21 may be called a loop filter 21, the VCO22 may be called a voltage control oscillator 22, and the 1/N DIV may be called a 1/N divider.

An overview of the clock generator circuit 50 operation is as follows. The oscillator 10 inputs a clock CL1 (first clock) and the PLL circuit 11 inputs a clock CL2 (second clock) to the selector 14. This selector 14 selectively outputs either a clock CL1 from the oscillator 10 or a clock CL2 from the PLL circuit 11 based on the switching signal S13 output from the selector signal generator circuit 13. During normal operation, the selector 14 outputs the clock CL2. When an abnormality is detected in the clock CL2 waveform, the selector 14 outputs the clock CL1. In the present embodiment, a delay circuit 12 is installed between the PLL circuit 11 and the selector 14. The abnormal waveform pulse in the clock CL2 is in this way prevented from being input to the subsequent function circuits (CPU60 through RAM64).

The connection relation between each structural element is described next, followed by the functions of each structural element.

The output from oscillator 10 is input to the PLL circuit 11 and the selector 14. The selector 14 (first input) input connects to the nodal point N1 between the oscillator 10 and the PLL circuit 11. The PLL circuit 11 and the selector 14 are in other words connected in parallel to the oscillator 10. The output from the PLL circuit 11 is input to the delay circuit 12 in the selector signal generator circuit 13. The selector signal generator circuit 13 input connects to the nodal point N3 between the PLL circuit 11 and the delay circuit 12. The delay circuit 12 and the selector signal generator circuit 13 are in other words connected in parallel to the nodal point N3. The output from the delay circuit 12 connects to the other input (second input) of the selector 14. The output from the selector signal generator circuit 13 connects to the control terminal of the selector 14. The selector signal generator circuit 13 includes an abnormal pulse detector circuit 13a and a timing control circuit 13b. The selector signal generator circuit 13 is connected to a nodal point N6 between the oscillator 10 and the selector 14. The output from the selector 14 connects to the function circuits (CPU1 through RAM65) in FIG. 1.

The functions of the circuit elements are each described next.

The oscillator 10 outputs a clock CL1 at a specified frequency. The oscillator 10 is a conventional oscillator circuit utilizing a crystal piezoelectric transducer or a ceramic piezoelectric transducer, etc.

The PLL circuit 11 outputs a clock CL2 synchronized with the clock CL1 from the oscillator 10. The feedback path includes a 1/N DIV23. The clock frequency output from the PLL circuit 11 therefore becomes a frequency N times higher than the clock (frequency) from the oscillator 10. The signal from the nodal point N2 between the VCO22 and the delay circuit 12 serves as the feedback signal.

The PD20 detects the phase differential between the clock CL2 from the VCO22 and the clock CL1 from the oscillator 10. The LF21 removes the alternating current (AC) component of the phase differential signal output from the PD20. The VCO22 adjusts the output clock frequency according to the phase differential signal output from the LF21. The 1/N DIV23 divides the clock by 1/N (N is an integer of 2 or more) and inputs it to the PD20.

The delay circuit 12 delays the clock CL2 from the PLL circuit 11 a specified time, and then outputs the clock to the selector 14. The overall structure of the delay circuit 12 is shown in FIG. 3. The delay circuit 12 as shown in FIG. 3 includes a delay circuit 12a and a delay circuit 12b. The delay circuit 12a and a delay circuit 12b are mutually connected in series. The delay circuit 12a and a delay circuit 12b respectively include multiple serially connected buffers 60. The amount of delay in the delay circuit 12 is determined by the number of serially connected buffers.

After the switching signal S13 is input to the selector 14, the amount of delay on the delay circuit 12 is set so the abnormal waveform pulse can be input to the selector 14. More specifically and as will be clarified in a description later on, the amount of delay is set based on the total time required to detect abnormal waveform pulses by the abnormal pulse detector circuit 13a, the time needed for the timing control circuit 13b operation, and the time needed for the selector 14 clock switching. By setting the amount of delay on the delay circuit 12 in this way prior to the selector 14 switching the clock, the abnormal waveform pulse can in this way be input to the selector 14, and (its) propagation to the subsequent function circuits can be prevented.

The selector signal generator circuit 13 detects abnormal waveform pulses in the clock CL2 and after detecting an abnormal waveform pulse, outputs the switching signal S13 to select and output the clock CL1 instead of the clock CL2 to the selector 14.

The selector signal generator circuit 13 includes an abnormal pulse detector circuit 13a and a timing control circuit 13b. The abnormal pulse detector circuit 13a detects abnormal waveform pulses from the clock CL2. When abnormal waveform pulses are then detected in the clock CL2, the selector signal generator circuit 13 outputs an abnormal detection signal S12 to the selector 14.

The timing control circuit 13b outputs a switching signal S13 based on the input from the abnormal detection signal S12. The timing control circuit 13b regulates the timing that the abnormal detection signal S12 output from the abnormal pulse detector circuit 13a is output to the selector 14 based on the clock CL1 input. The time point that the selector 14 switches from the clock CL2 to the clock CL1 can in this way be synchronized with the rising edge of the clock CL1.

The selector 14 switches the clock output from clock CL2 to clock CL1 to now serve as the system clock, based on the input of switching signal S13. In other words, during normal operation, the selector 14 outputs the clock CL2 as the system clock. On the other hand, if an abnormal waveform from clock CL2 was detected and the switching signal S13 was input; then the selector 14 outputs the clock CL1 as the system clock instead of the clock CL2.

The composition and operation of the abnormal pulse detector circuit 13a is described next using FIG. 4 and FIG. 5. Here, FIG. 4 shows an overall circuit diagram of the abnormal pulse detector circuit 13a. FIG. 5 is a timing chart for describing the operation of the abnormal pulse detector circuit 13a.

The abnormal pulse detector circuit 13a as shown in FIG. 4, includes a High (H) level decision circuit 25, a low (Low) level decision circuit 26, an OR circuit 27, and a pulse expansion circuit 28. The High (H) level decision circuit 25 and the low (Low) level decision circuit 26 are connected in parallel to the nodal point N3. The outputs from the High (H) level decision circuit 25 output and the low (Low) level decision circuit 26 are input to the OR circuit 27. The output from the OR circuit 27 is input to the pulse expansion circuit 28. The output from the pulse expansion circuit 28 connected to the nodal point N5.

The High (H) level decision circuit 25 includes F/F (Flip/Flop) circuits 30, 31, 32, the delay circuits 33, 34, 35 and the NAND circuit 36.

The F/F (Flip/Flop) circuits 30, 31, 32 are connected in parallel to the nodal point N3. The delay circuits 33, 34, 35 are connected in series to the nodal point N3. The nodal point N7 between the delay circuit 33 and the delay circuit 34 are connected to the CLK terminal of the F/F circuit 30. The nodal point N8 between the delay circuit 34 and the delay circuit 35 connects to the CLK terminal of the F/F circuit 31. The output from the delay circuit 35 connects to the CLK terminal of the F/F circuit 32.

The F/F (Flip/Flop) circuits 30-32 store the H level status of the clocks CL2 from the nodal point N3 at different time points. The F/F circuit 30 stores the clock CL2 state at a specified time after the rising edge of the clock CL2 delayed by the delay circuit 33. The F/F circuit 31 stores the state of the clock CL2 at a specified delay time delayed by the delay circuit 34 more than the F/F circuit 30. The F/F circuit 32 stores the clock CL2 status at a specified delay time delayed by the delay circuit 35 more than the F/F circuit 31. The High (H) level decision circuit 25 in other words, judges the H level state of the clock CL2 at multiple time points.

A NAND circuit 36 outputs a H level signal when a L level signal was output from any of the F/F circuits 30-32.

The L level decision circuit 26 includes the F/F (Flip/Flop) circuits 40, 41, 42, the delay circuits 43, 44, 45, and the OR circuit 46.

The F/F circuits 40, 41, 42 are connected in parallel to the nodal point N3. The delay circuits 43, 44, 45 are connected in series to the nodal point N3. The nodal point N9 between the delay circuit 43 and the delay circuit 44 connects to the CLK terminal of the F/F circuit 40. The nodal point N10 between the delay circuit 44 and the delay circuit 45 connects to the CLK terminal on the F/F circuit 41. The output of the delay circuit 45 connects to the CLK terminal on the F/F circuit 42.

The F/F circuits 40-42 store the L level state of the clock CL2 from the nodal point N3 at different time points. The F/F circuit 40 stores the state of the clock CL2 after a specified time from the falling edge of the clock CL2 per the delay circuit 43. The F/F circuit 41 stores the state of the clock CL2 after a specified delay time per the delay circuit 44 that is more than the delay circuit 40. The F/F circuit 42 stores the state of the clock CL2 after a specified delay time set by the delay circuit 45 that is more than the F/F circuit 41. In other words, the L level decision circuit 26 judges the L level state of the clock CL2 at multiple different time points.

The OR circuit 46 outputs a H level signal when a H level signal was output from any of the F/F circuits 40-42.

When an H level detection signal from the L level decision circuit 26 or the H level decision circuit 25 was input, the OR circuit 27 outputs the abnormal detection signal S12 for a H level with a specified pulse width.

The pulse expansion circuit 28 elongates the pulse width of abnormal detection signal S12 output from the OR circuit 27 and outputs it. This pulse expansion circuit 28 is for example a monostable multivibrator.

Figure 5A:
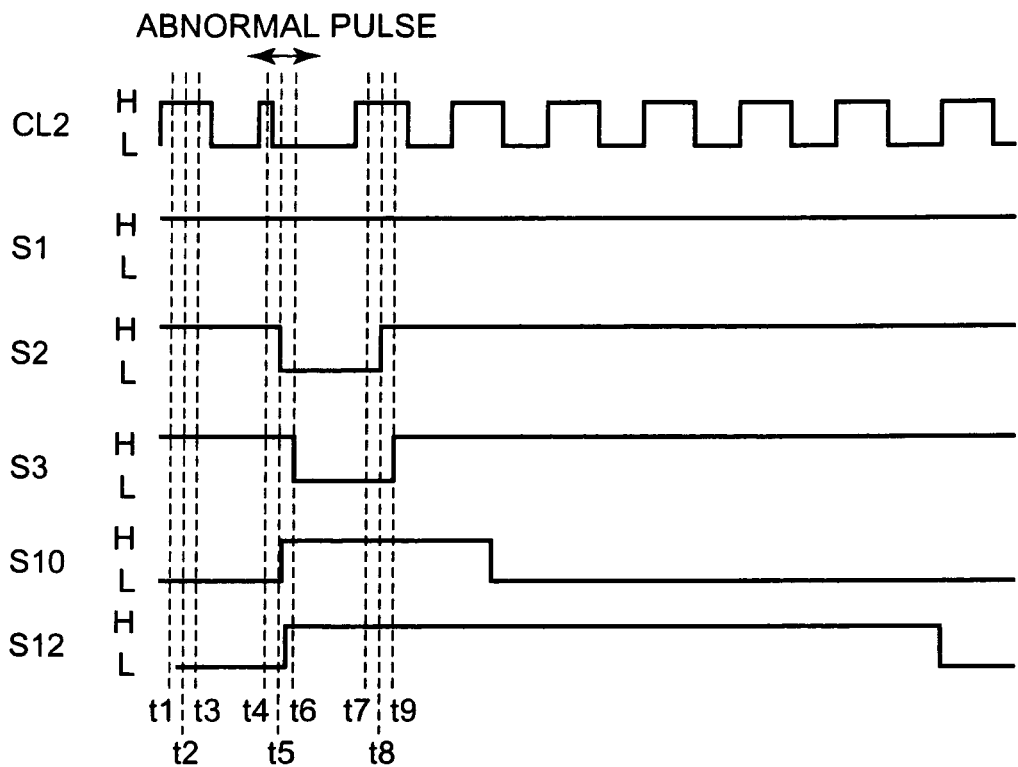
Figure 6:
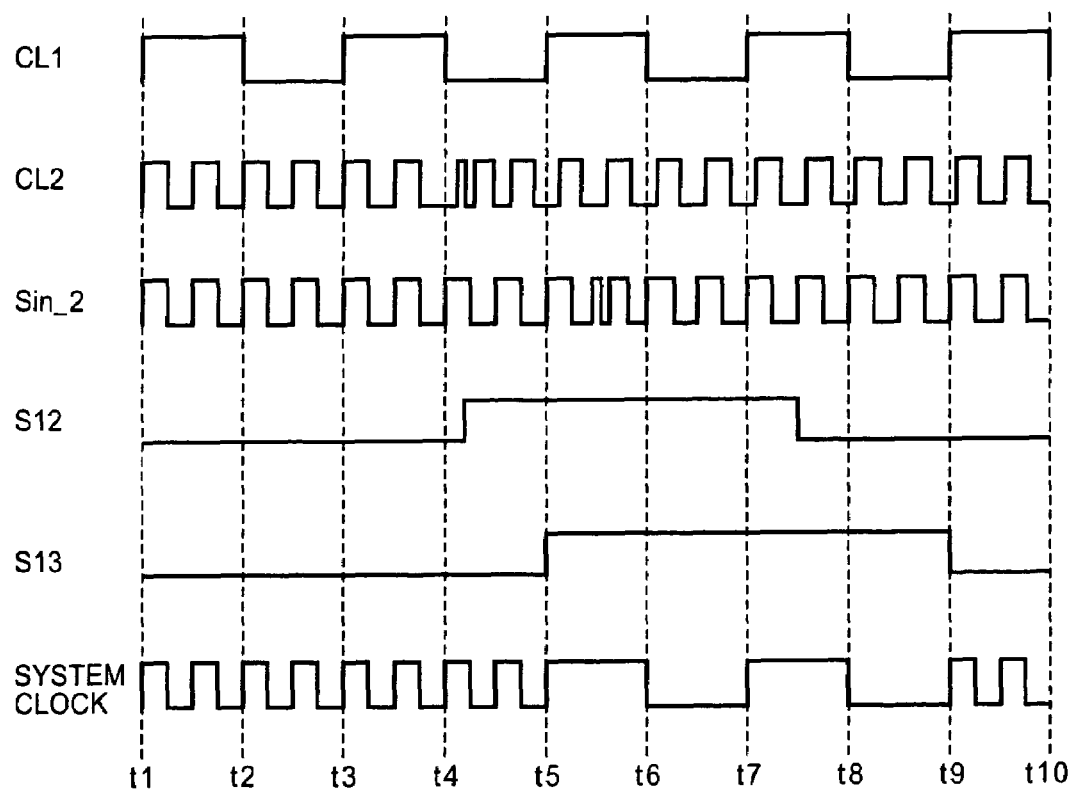
FIG. 6 is a timing chart for describing the operation of the clock generator circuit 50.

FIG. 5A shows a timing chart for describing the operation of the High (H) level decision circuit 25.

The pulse waveform of the clock C2 is not abnormal during the times t1-t3. In other words, the clock CL2 is at H level during the times t1-t3. The F/F circuits 30-32 therefore hold the H level signal.

The pulse waveform of the clock C2 is abnormal during the times t4-t6.

The clock CL2 is at H level during the time t4. The F/F circuit 30 therefore holds the H level signals.

The clock CL2 is at L level during the time t5. The F/F circuit 31 therefore holds the L level signals. There is a slight delay from the time t5, and the High (H) level decision circuit 25 outputs an H level signal S10. The S10 output is slightly delayed and the pulse expansion circuit 28 outputs an abnormal detection signal S12.

The clock CL2 is at L level at the time t6. The F/F circuit 32 therefore holds the L level signals. In this case, the operation is identical to the time t5.

The operation at t7-t9 is the same as at time t1-t3.

The abnormal pulse detector circuit 13a detects the clock CL2 abnormal waveform pulse in this way. The abnormal pulse detector circuit 13a then outputs the abnormal detection signal S12.

Figure 5B:
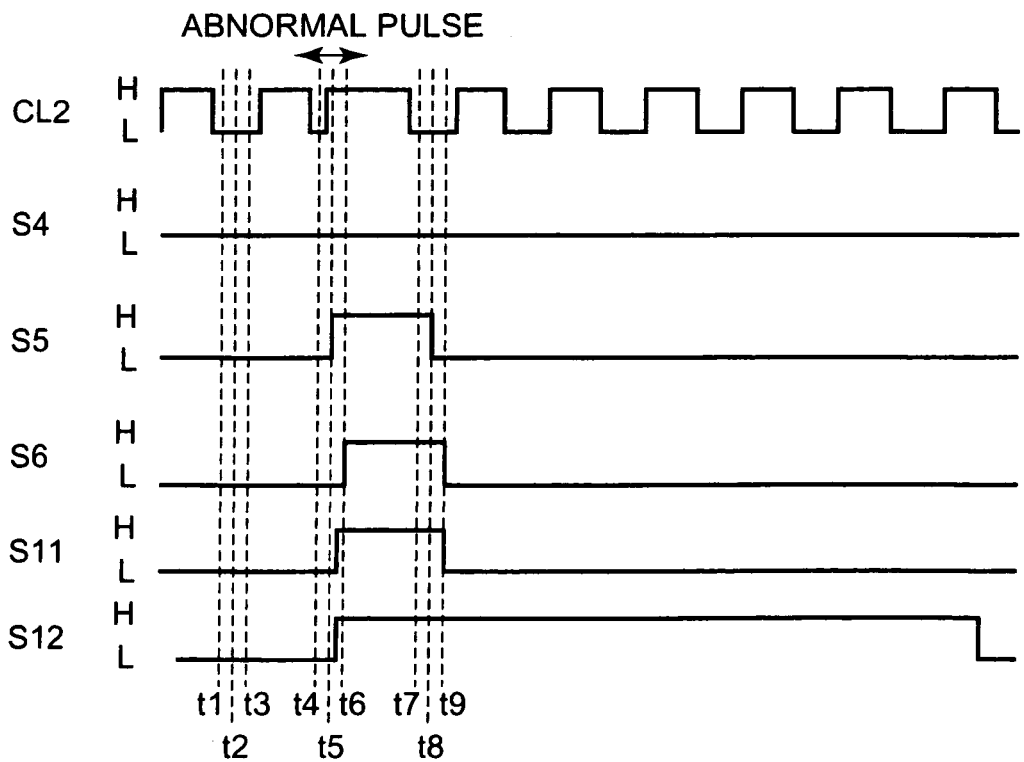

FIG. 5B shows a timing chart for describing the operation of the Low (L) level decision circuit 26.

There is no abnormality in the clock CL2 pulse waveform in the times t1-t3. Namely, the clock CL is at L level in the period from t1-t3. Therefore the F/F circuits 40-41 hold the L level signal.

The clock CL2 pulse waveform is abnormal the time t4-t6.

The clock CL2 is at L level at the time t4. The F/F circuit 40 therefore holds the L level signal.

The clock CL2 is at H level at the time t5. The F/F circuit 41 holds the H level signal. The time is then delayed slightly from the time t5, and the L level decision circuit 26 output an H level signal S11. The time is then delayed slightly from the S11 output and the abnormal detection signal S12 is output from the pulse expansion circuit 28.

The clock CL2 is at H level at the time t6. The F/F circuit 42 therefore holds the H level signal. Operation in this case is the same as the time t5.

Operation at the times t7-t9 is the same as the times t1-t3.

The abnormal pulse detector circuit 13a in this way detects an abnormal L level of clock CL2. The abnormal pulse detector circuit 13a then outputs an abnormal detection signal S12.

Abnormal waveform pulses can be detected with high accuracy by identifying both the H level state and the L level state of the clock CL2 at multiple differing time points. Abnormal waveform pulses are in this way effectively prevented from propagating to subsequent (downstream) function circuits.

The function of the clock generator circuit 50 is described next while referring to FIG. 6. The CL1 here is the clock CL1 that the oscillator 10 input to the selector 14. The CL2 here is the clock CL2 that was output from the PLL circuit 11. The Sin_2 here is a clock CL2 input by way of the delay circuit 12 to the selector 14. The S12 is an abnormal detection signal output from the abnormal pulse detector circuit 13a. The S13 is a switching signal output from the timing control circuit 13b. The system clock is a clock output from the selector 14.

As shown in FIG. 6, the clock CL2 waveform is not abnormal from the time t1-t4.

After the time t4 elapses, distortion occurs in the clock CL2 waveform. The abnormal pulse detector circuit 13a promptly detects the abnormal clock CL2 waveform. S12.

At the time t5, the timing control circuit 13b outputs the abnormal detection signal S12 as the switching signal S13 to the selector 14 based on the first clock CL1 that was input. The selector 14 then promptly switches to the clock for output as the system clock.

Then at the time t5, the selector 14 outputs the clock CL1 as the system clock instead of the clock CL2. The time t5 where the clocks are switched matches the time point at the rising edge of the clock CL1.

The operation of the clock generator circuit 50 in this way is highly accurate in preventing abnormal clocks occurring in the clock CL2 from propagating to the function circuits downstream from the selector 14.

In this embodiment, the delay circuit 12 is provided between the PLL circuit 11 and the selector 14. The abnormal waveform pulse contained in the clock CL2 is in this way prevented from being input to the subsequent (downstream) function circuits (CPU60-RAM64).

The selector signal generator circuit 13 as described above contains an abnormal pulse detector circuit 13a and a timing control circuit 13b. The timing control circuit 13b controls the timing that the abnormal detection signal S12 output from the abnormal pulse detector circuit 13a is output to the selector 14 based on the clock CL1 input. The selector 14 in this way makes the time point for switching from the clock CL2 to the clock CL1 match the time point for the rising edge of the clock CL1. In other words, the selector 14 prevents abnormal pulses from being generated by switching of the clock itself.

The abnormal pulse detector circuit 13a as described above identifies both the H level state and the L level state of the clock CL2 at multiple differing time points. Abnormal waveform pulses can in this way be efficiently detected with high accuracy.

Moreover the abnormal waveform pulses are prevented from propagating to subsequent function circuits.

The delay circuit 12 contains multiple serially connected buffers 60 as described above. The amount of delay can therefore easily be set on the delay circuit 12 by setting the number of buffers 60 for use.

Second Embodiment

Figure 7:
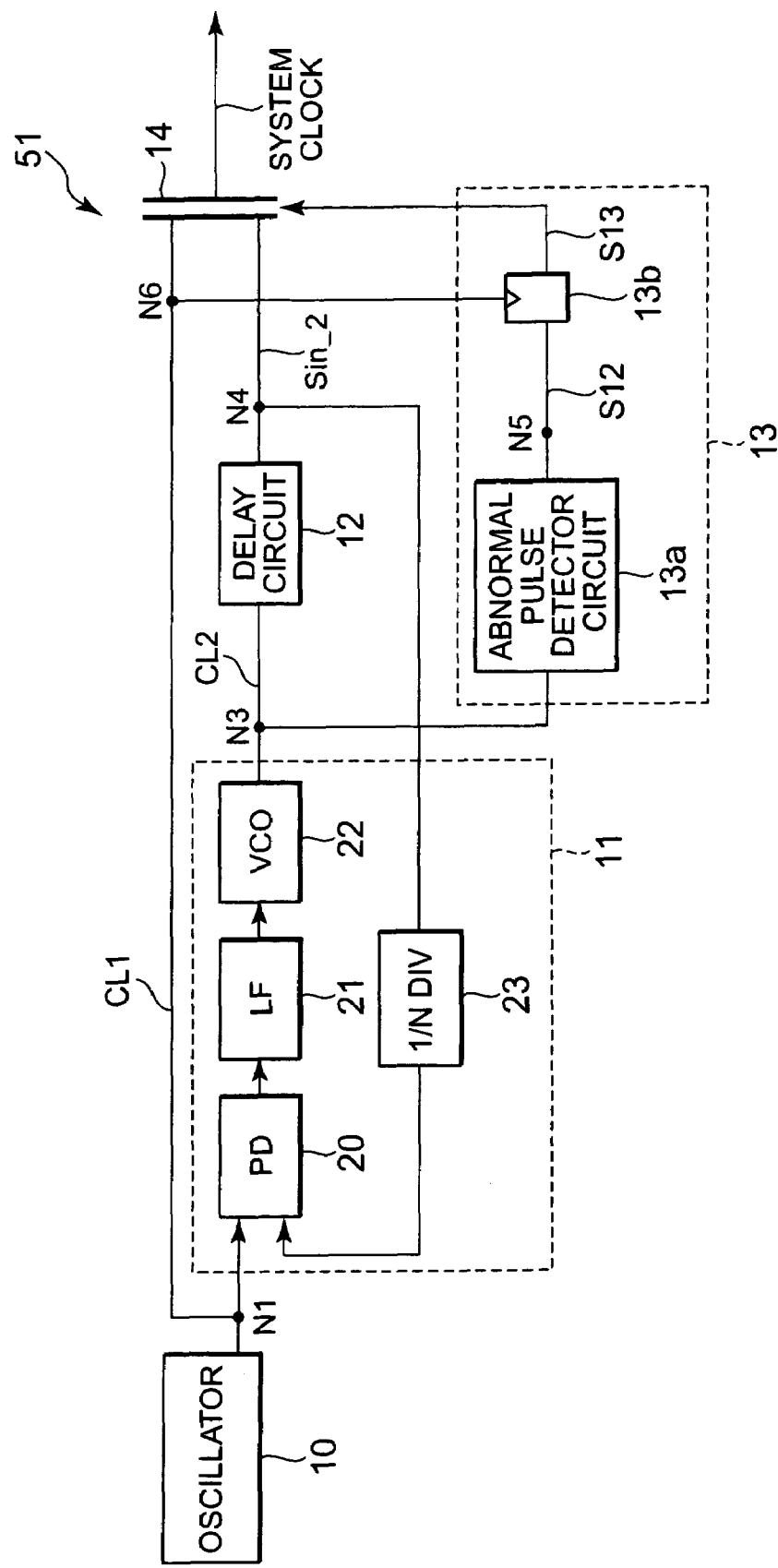
FIG. 7 is a circuit block diagram showing the overall structure of the clock generator circuit 51 of the second embodiment.

The second embodiment of this invention is described next while referring to FIG. 7. Here, FIG. 7 is a circuit block diagram showing the overall structure of the clock generator circuit. Descriptions identical to the first embodiment are omitted. The effects described for the first embodiment are applicable unchanged to this embodiment.

In this embodiment, the nodal point N4 between the delay circuit 12 and the selector 14 inputs a feedback signal to the PLL circuit 11. This feedback signal allows simplifying the structure of the timing control circuit 13b. In other words, there is no need to design a timing control circuit 13b to handle the synchronizing offset occurring between the clock CL2 and the clock CL1 input to the selector 14. Utilizing a simple circuit such as F/F13b eliminates the task of expanding the circuit scale more than necessary.

As shown in FIG. 7, in this embodiment an F/F (flip flop) is utilized as a timing control circuit 13b. The F/F 13b regulates the timing for outputting the abnormal detection signal S12 as the switching signal S13 based on the clock CL1 input from the nodal point N6.

Third Embodiment

Figure 8:
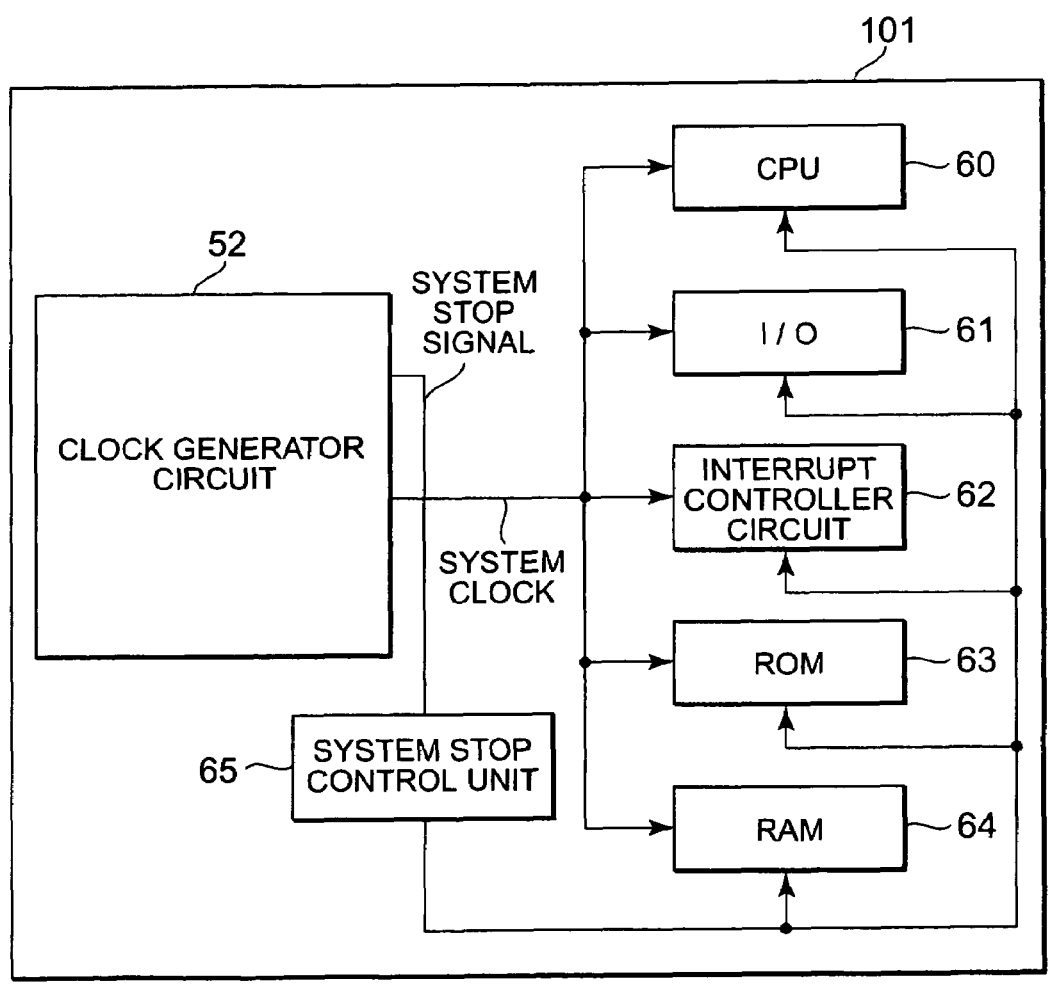
FIG. 8 is a block diagram showing the overall structure of the semiconductor integrated circuit (microcomputer) including the clock generator circuit 52 for the third embodiment.
Figure 9:
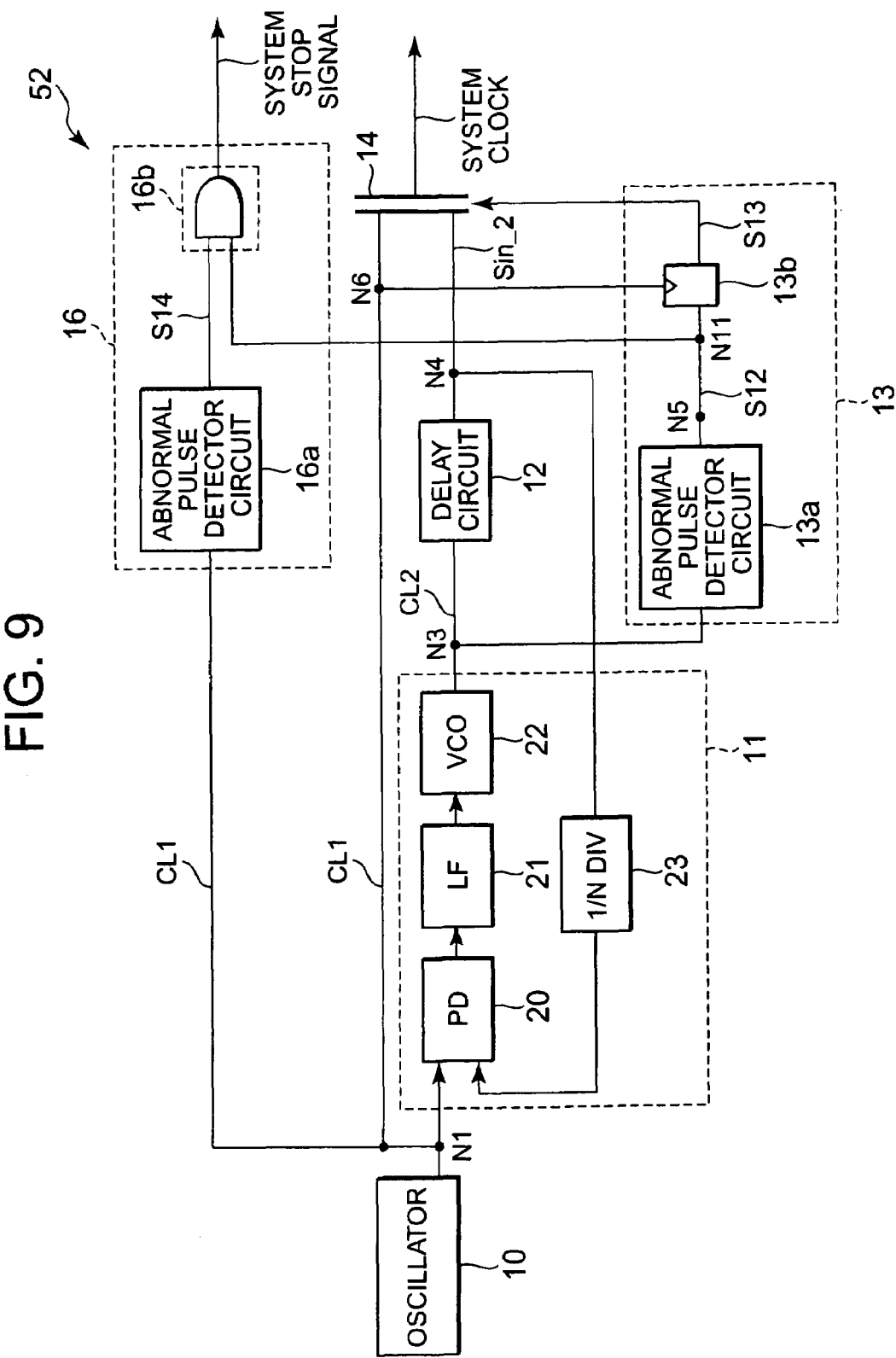
FIG. 9 is a circuit diagram showing the overall structure of the clock generator circuit 52.
Figure 10:
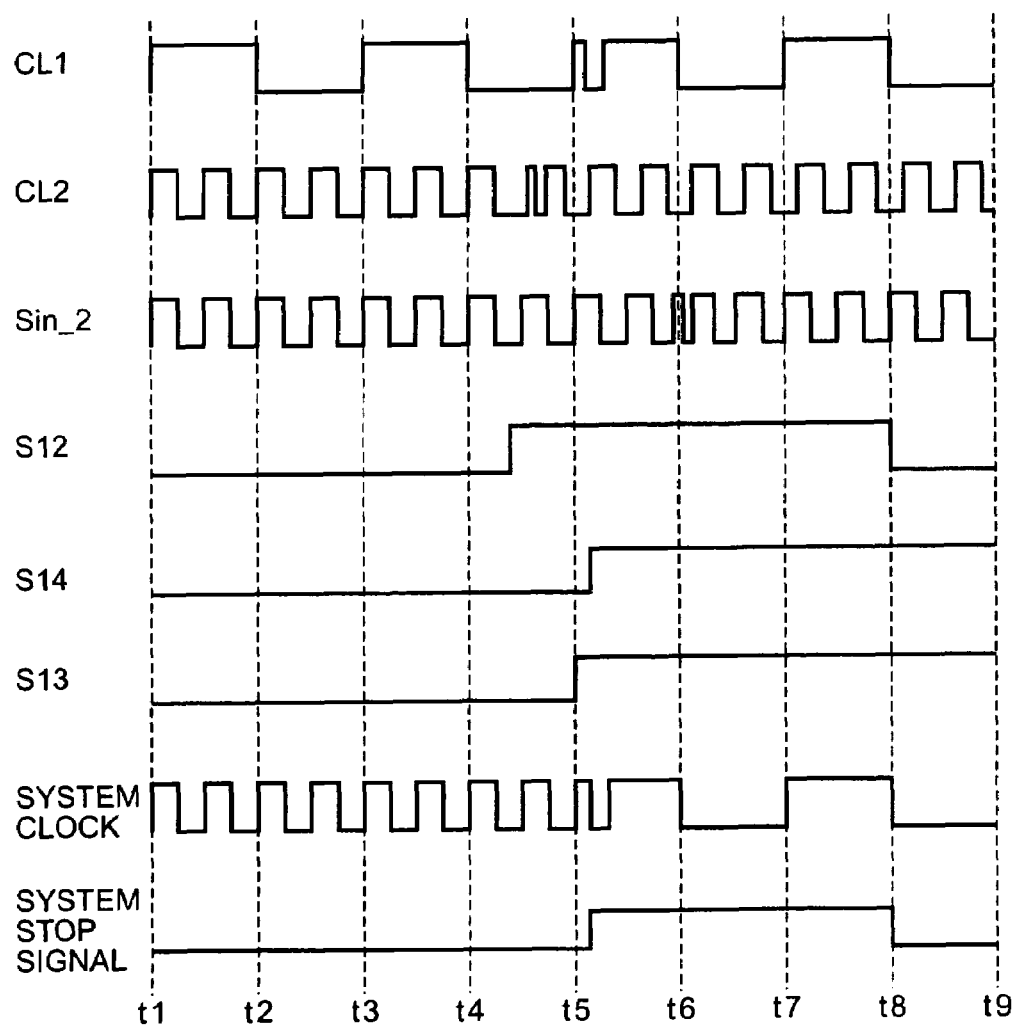
FIG. 10 is a timing chart for describing the operation of the clock generator circuit 52.
Figure 11:
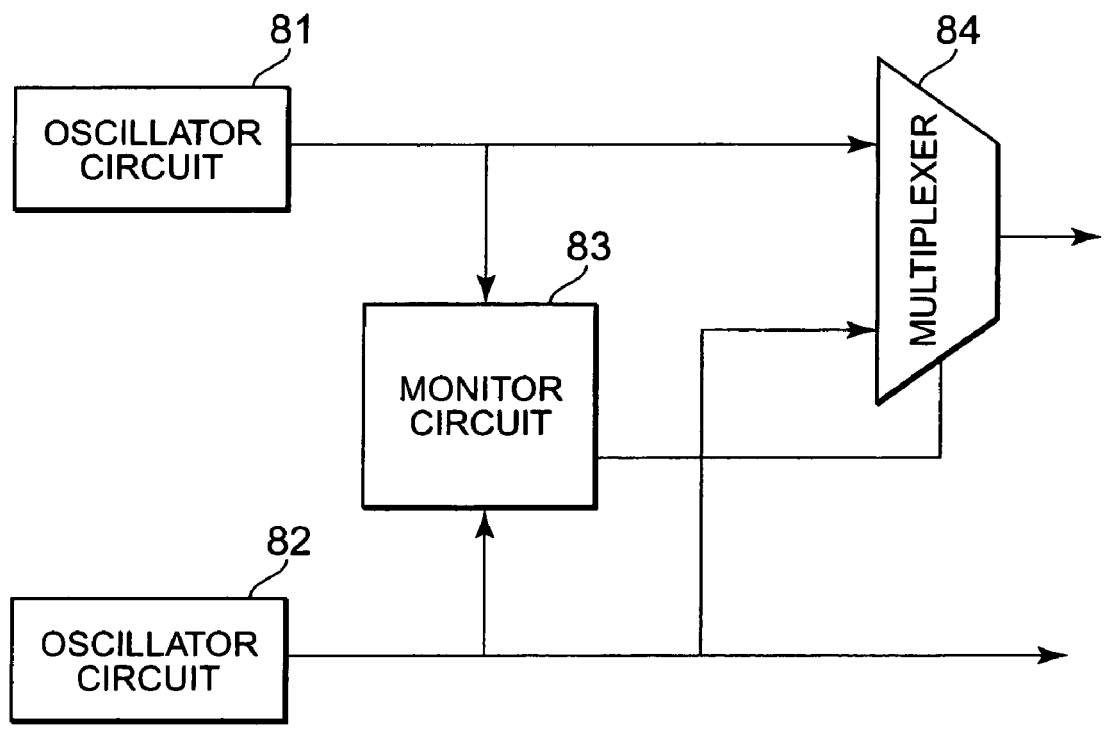
FIG. 11 is a block diagram for describing the technology of the related art.

The third embodiment of this invention is described next while referring to FIG. 8 through FIG. 10. FIG. 8 is a block diagram showing the overall structure of the semiconductor integrated circuit (microcomputer) including a clock generator circuit 52. FIG. 9 is a circuit diagram showing the overall structure of the clock generator circuit 52. FIG. 10 is a timing chart for describing the operation of the clock generator circuit 52. Descriptions identical to the first and second embodiments are omitted. The effects described for the first embodiment and the second embodiment are applicable unchanged to this embodiment.

As shown in FIG. 8, the clock generator circuit 52 outputs a system stop signal. The system stop control unit 65 stops the operation of the CPU60 through RAM64 based on input of a system stop signal.

The clock generator circuit 52 shown in FIG. 9 includes a stop signal generator circuit 16.

The stop signal generator circuit 16 outputs a system stop signal when there is an abnormal waveform pulse in the clock CL1, and also an abnormal waveform pulse in the clock CL2. The abnormal waveform pulses are in this way prevented from propagating to subsequent (downstream) function circuits, and the function circuits more securely protected from faulty operation.

The oscillator 10 output connects to a first input of the stop signal generator circuit 16. The output from the abnormal pulse detector circuit 13a connects to the second input of the stop signal generator circuit 16. In other words, the clock CL1 and the abnormal detection signal S12 are input to the stop signal generator circuit 16.

The stop signal generator circuit 16 contains an abnormal pulse detector circuit 16a and a decision circuit 16b.

The structure and operation of the abnormal pulse detector circuit 16a are equivalent to the structure and operation of the abnormal pulse detector circuit 13a. The abnormal pulse detector circuit 16a however detects abnormal waveform pulses of the clock CL1 and outputs them as the abnormal detection signal S14.

The decision circuit 16b is here an AND circuit. The first input to AND circuit 16b connects to the output of the abnormal pulse detector circuit 16a. The second input to the AND circuit 16b connects to the output of the abnormal pulse detector circuit 13a. The AND circuit 16b outputs a system stop signal when there are inputs from the abnormal detection signal S14 and the abnormal detection signal S12. The abnormal detection signal S14 and the abnormal detection signal S12 are both H level signals.

As shown in FIG. 10, the waveform of the clock CL1 is abnormal between the time t5 and the time t6. The abnormal pulse detector circuit 16a promptly detects the abnormal clock CL1, and outputs the abnormal detection signal S14 to the AND circuit 16b. As clearly shown in FIG. 10, the abnormal detection signal S12 is input to the AND circuit 16b at this point in time. The AND circuit 16b therefore outputs a system stop signal immediately after the abnormal detection signal S14 is input.

If the clock CL1 waveform is abnormal then the subsequent (downstream) function circuits cannot be prevented from possibly malfunctioning even if the output clock is switched from clock CL2 to clock CL1. In view of this problem, the present embodiment utilizes the stop signal generator 16 to more reliably prevent faulty operation in the downstream function circuits.

The technical scope of this invention is not limited to the above embodiments. Namely the specific structure of the PLL circuit, selector, abnormal pulse detector circuit, timing control circuit and delay circuit are optional. Moreover, the clock generator circuit can function as a clock selector circuit by eliminating the oscillator 10 and the PLL circuit 11. It is apparent that the invention may be modified and changed without departing from the scope and spirit of the invention.

What is claimed is:

1. A clock generator circuit comprising:
a phase synchronizing circuit outputting a second clock synchronized with a first clock;
a selector outputting either the first clock or the second clock as an output clock according to a switching signal;
a selector signal generator circuit outputting the switching signal for the selector to output the first clock instead of the second clock when an abnormal waveform pulse is detected in the second clock; and
a delay circuit delaying the second clock input to the selector so that the selector switches the output clock from the second clock to the first clock according to the switching signal before the abnormal waveform pulse is input to the selector.

2. The clock generator circuit according to claim 1,
wherein the selector signal generator circuit includes:
an abnormal pulse detector circuit detecting the abnormal waveform pulse and outputting an abnormal detection signal when finding the abnormal waveform pulse; and
a timing control circuit outputting the abnormal detection signal, synchronized with the first clock, to the selector as the switching signal.

3. The clock generator circuit according to claim 2,
wherein the abnormal pulse detector circuit includes:
a first level detector circuit judging whether signal levels of the second clock at multiple time points are at a first level; and
a second level detector circuit judging whether signal levels of the second clock at multiple time points are at a second level.

4. The clock generator circuit according to claim 1, wherein an amount of delay in the delay circuit is set based on a processing time for the selector signal generator circuit and the selector.

5. The clock generator circuit according to claim 4, wherein the delay circuit comprises multiple serially connected buffers.

6. The clock generator circuit according to claim 1, further comprising:
a stop signal generator circuit outputting a system stop signal in order to stop function circuits operated by the output clock, based on detection of an abnormal waveform pulse in the first clock and detection of the abnormal waveform pulse in the second clock.

7. The clock generator circuit according to claim 6,
wherein the abnormal pulse detector circuit comprises a first abnormal pulse detector circuit, and
wherein the stop signal generator circuit includes:
a second abnormal pulse detector circuit outputting an abnormal detection signal when detecting the abnormal waveform pulse in the first clock; and
a decision circuit outputting the system stop signal based on the abnormal detection signals from the second abnormal pulse detector circuit and the first abnormal pulse detector circuit.

8. The clock generator circuit,
a phase synchronizing circuit outputting a second clock synchronized with a first clock;
a selector outputting either the first clock or the second clock as an output clock according to a switching signal; and
a selector signal generator circuit outputting the switching signal for the selector to output the first clock instead of the second clock when an abnormal waveform pulse is detected in the second clock;
wherein the selector signal generator circuit includes:
an abnormal pulse detector circuit detecting the abnormal waveform pulse and outputting an abnormal detection signal when detecting the abnormal waveform pulse; and
a timing control circuit outputting the abnormal detection signal, synchronized with the first clock, to the selector as the switching signal.

9. The clock generator circuit according to claim 8, wherein the timing control circuit comprises a flip-flop circuit.

10. A clock selector circuit comprising:
a selector outputting either a first clock or a second clock as an output clock based on a switching signal;
a selector signal generator circuit outputting the switching signal to the selector to output the first clock instead of the second clock when an abnormal waveform pulse is detected in the second clock input to the selector; and
a delay circuit delaying the second clock input to the selector in order to switch the output clock from the second clock to the first clock before the abnormal waveform pulse is input to the selector.

11. The clock selector circuit according to claim 10,
wherein the selector signal generator circuit includes:
an abnormal pulse detector circuit outputting an abnormal detection signal when detecting the abnormal waveform pulse; and
a timing control circuit outputting the abnormal detection signal, synchronized with the first clock, to the selector as the switching signal.

12. The clock selector circuit according to claim 11,
wherein the abnormal pulse detector circuit includes:
a first level detector circuit judging whether signal levels of the second clock at multiple time points are at a first level; and
a second level detector circuit judging whether signal levels of the second clock at multiple time points are in a second level.

13. The clock selector circuit according to claim 10, wherein an amount of delay in the delay circuit is set based on a processing time for the selector signal generator circuit and the selector.

14. The clock selector circuit according to claim 13, wherein the delay circuit comprises multiple serially connected buffers.

* * * * *